US012447792B2

(12) United States Patent
Asada

(10) Patent No.: US 12,447,792 B2
(45) Date of Patent: Oct. 21, 2025

(54) CONTROL DEVICE AND CONTROL METHOD

(71) Applicant: ISUZU MOTORS LIMITED, Tokyo (JP)

(72) Inventor: Shohei Asada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 158 days.

(21) Appl. No.: 18/548,162

(22) PCT Filed: Mar. 28, 2022

(86) PCT No.: PCT/JP2022/014795
§ 371 (c)(1),
(2) Date: Aug. 28, 2023

(87) PCT Pub. No.: WO2022/210463
PCT Pub. Date: Oct. 6, 2022

(65) Prior Publication Data
US 2024/0300283 A1 Sep. 12, 2024

(30) Foreign Application Priority Data
Mar. 29, 2021 (JP) ................................ 2021-055078

(51) Int. Cl.
*B60H 1/00* (2006.01)
(52) U.S. Cl.
CPC ..... *B60H 1/00278* (2013.01); *B60H 1/00899* (2013.01); *B60H 2001/00307* (2013.01)
(58) Field of Classification Search
CPC ............ B60H 1/00278; B60H 1/00899; B60H 1/0073; B60H 2001/00307; B60L 58/12;
(Continued)

(56) References Cited

U.S. PATENT DOCUMENTS

2014/0326430 A1 11/2014 Carpenter et al.
2015/0217622 A1 8/2015 Enomoto et al.
(Continued)

FOREIGN PATENT DOCUMENTS

JP 2014-043181 A 3/2014
JP 2020-111084 A 7/2020
KR 10-2020-0065186 A 6/2020

OTHER PUBLICATIONS

Patent Cooperation Treaty, International Search Report, Application No. PCT/JP2022/014795, dated Jun. 7, 2022, in 4 pages.

*Primary Examiner* — Joseph F Trpisovsky
(74) *Attorney, Agent, or Firm* — PROCOPIO, CORY, HARGREAVES & SAVITCH LLP

(57) ABSTRACT

A control device includes: an acquiring part that acquires a temperature of a battery cell of the battery; an identifying part that identifies a charge amount of the battery; and a cooling control part that determines a cooling-onset battery cell temperature on the basis of the charge amount identified by the identifying part, and operates an electric compressor to begin cooling the cooling water with the secondary refrigerant on condition that the temperature acquired by the acquiring part is higher than the determined, cooling-onset battery cell temperature. When the identifying part identifies a first charge amount, the cooling control part determines a higher cooling-onset battery cell temperature than in a case where the identifying part identifies a second charge amount that is higher than the first charge amount.

10 Claims, 8 Drawing Sheets

(58) Field of Classification Search
CPC .... B60L 58/16; B60L 58/26; B60L 2240/545; B60K 2001/005; B60K 11/02; F25B 49/022; F25B 2600/02; F25B 2600/024; F25B 2600/025
See application file for complete search history.

(56) References Cited

U.S. PATENT DOCUMENTS

| | | | |
|---|---|---|---|
| 2016/0318499 A1* | 11/2016 | Yamanaka | B60L 58/27 |
| 2020/0171919 A1* | 6/2020 | Ishizeki | F25B 5/02 |
| 2020/0215871 A1 | 7/2020 | Tomita et al. | |
| 2020/0240869 A1 | 7/2020 | Yesh et al. | |

* cited by examiner

CONTROL DEVICE AND CONTROL METHOD

CROSS-REFERENCE TO RELATED APPLICATIONS

The present application is a U.S. National Stage entry of PCT Application number PCT/JP2022/014795, filed on Mar. 28, 2022, which claims priority under 35 U.S.C § 119 (a) to Japanese Patent Application No. 2021-055078, filed on Mar. 29, 2021, contents of which are incorporated herein by reference in their entirety.

TECHNICAL FIELD

The present disclosure relates to a control device and a control method for controlling a device cooling a battery.

BACKGROUND OF THE INVENTION

It has been proposed to cool a battery in order to prevent deterioration of a battery mounted in an electric vehicle during traveling (e.g., Patent Document 1).

PRIOR ART

Patent Document

Patent Document 1: Japanese Unexamined Patent Application Publication No. 2014-043181

BRIEF DESCRIPTION OF THE INVENTION

Problem to be Solved by the Invention

In the technique described in Patent Document 1, a battery is cooled by heat exchange between cooling water circulating a cooling water circuit and the battery. The cooling water after heat exchange is cooled again with a low-pressure refrigerant circulating a refrigeration cycle in a chiller. In the technique described in Patent Document 1, an electric compressor, which is a component of the refrigeration cycle consumes more power.

The present disclosure has been made in view of these points, and its object is to provide a technique that can reduce the power required for cooling a battery.

Means for Solving the Problem

A control device according to a first aspect of the present disclosure is a control device controlling an electric compressor included in a refrigeration cycle for circulating a secondary refrigerant for cooling of cooling water that exchanges heat with a battery, the control device includes: an acquiring part that acquires a temperature of a battery cell of the battery: an identifying part that identifies a charge amount of the battery; and a cooling control part that determines a cooling-onset battery cell temperature on the basis of the charge amount identified by the identifying part, and operates the electric compressor to begin cooling the cooling water with the secondary refrigerant, on condition that the temperature acquired by the acquiring part is higher than the determined, cooling-onset battery cell temperature, wherein when the identifying part identifies a first charge amount, the cooling control part determines the cooling-onset battery cell temperature that is higher than in a case where the identifying part identifies a second charge amount that is higher than the first charge amount.

The cooling control part may cool the cooling water with the secondary refrigerant so that the temperature of the battery cell does not exceed a predetermined upper limit temperature during a time period before the battery dies. The cooling control part may cool the cooling water with a chiller for exchanging heat between the cooling water and the secondary refrigerant, and may alternately switch between an open state in which the refrigerant expansion valve is open and a closed state in which the refrigerant expansion valve is closed, thereby controlling an amount of cooling for cooling the cooling water with the secondary refrigerant supplied to the chiller through the refrigerant expansion valve, and may determine a rate of a time period during which to bring the refrigerant expansion valve into the open state relative to an entire time period so that the temperature of the battery cell becomes lower than the upper limit temperature during the time period before the battery dies.

The control device may further include an air-conditioning control part that reduces a temperature inside a vehicle by exchanging heat between the secondary refrigerant and air inside the vehicle in an evaporator included in the refrigeration cycle, and stops heat exchange between the secondary refrigerant and the air inside the vehicle, every predetermined time period, for a stoppage time period that is shorter than the predetermined time period, when the cooling control part is cooling the cooling water with the secondary refrigerant, on condition that the temperature acquired by the acquiring part is higher than a transition temperature.

The control device may further include an output detecting part that detects output of the battery, wherein the air-conditioning control part need not stop the heat exchange between the secondary refrigerant and the air in the interior when the output of the battery is equal to or less than a reference value. The identifying part may identify a degree of deterioration of the battery, and when the identifying part identifies a first degree of deterioration in a state where the charge amount identified by the identifying part is equal to or greater than a predetermined value, the cooling control part may determine the cooling-onset battery cell temperature that is higher than in a case where the identifying part identifies a second charge amount that is higher than the first charge amount in a state where the charge amount is equal to or greater than the predetermined value.

The acquiring part may acquire a first water temperature of the cooling water measured by a first water temperature sensor disposed upstream of a radiator that exchanges heat between the cooling water and outside air in a cooling water circuit for exchanging heat between the battery and the cooling water, and a second water temperature of the cooling water measured by a second water temperature sensor disposed downstream of the radiator, and the control device may further include a switching control part that controls a switching part for switching a flow path of the cooling water so that the cooling water circulates through a first cooling water circuit that passes through the radiator when a value obtained by subtracting the second water temperature from the first water temperature is equal to or greater than a first reference value, and controls the switching part so that the cooling water circulates through a second cooling water circuit that does not pass through the radiator when the value obtained by subtracting the second water temperature from the first water temperature is less than a second reference value that is smaller than the first reference value. The cooling control part may identify an expected arrival time when a vehicle equipped with the control device arrives at a destination, and may cool the cooling water with the secondary refrigerant so as to reduce the temperature of the battery cell of the battery to a predetermined pre-stoppage temperature or lower by the expected arrival time. The acquiring part may acquire temperatures of a plurality of the battery cells of the battery, and the cooling control part may begin cooling the cooling water with the secondary refrigerant on condition that a highest temperature among the temperatures of the battery cells acquired by the acquiring part is higher than the cooling-onset battery cell temperature.

A control method according to a second aspect of the present disclosure is a control method for controlling an electric compressor included in a refrigeration cycle for circulating a secondary refrigerant for cooling of cooling water that exchanges heat with a battery, the control method includes steps of: acquiring a temperature of a battery cell of the battery: identifying a charge amount of the battery: determining a cooling-onset battery cell temperature on the basis of the identified charge amount; and beginning cooling of the cooling water with the secondary refrigerant by operating the electric compressor on condition that the acquired temperature is higher than the determined, cooling-onset battery cell temperature, wherein when the first charge amount is identified, the determining the cooling-onset battery cell temperature determines the cooling-onset battery cell temperature that is higher than in a case where a second charge amount that is higher than the first charge amount is identified.

Effect of the Invention

According to the present disclosure, it is possible to reduce the power required for cooling a battery.

DESCRIPTION OF EMBODIMENTS

[Outline of the Vehicle 100]

Figure 1:
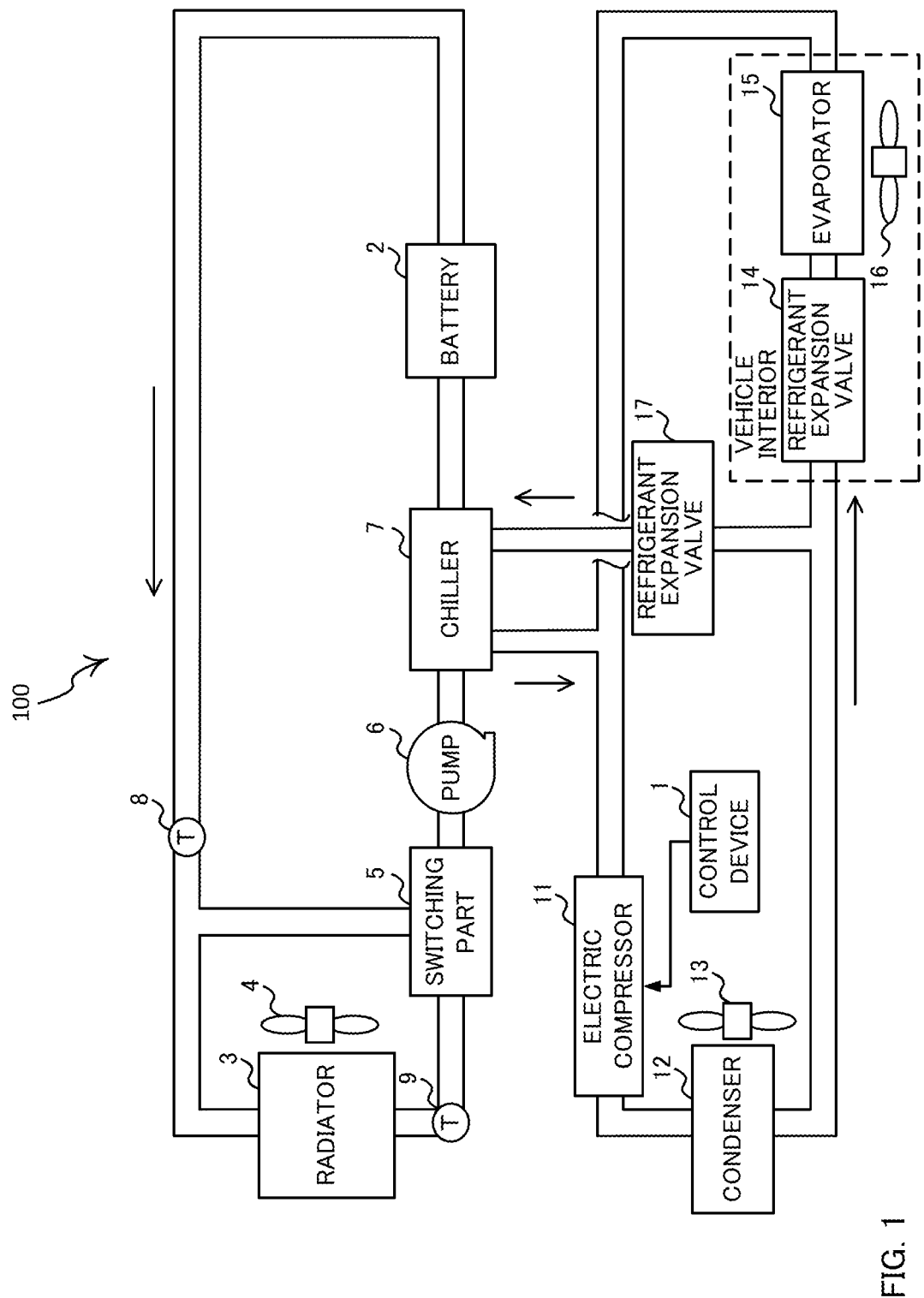
FIG. 1 shows an outline of a vehicle equipped with a control device according to an embodiment.

FIG. 1 shows an outline of a vehicle 100 equipped with a control device 1 of the present embodiment. In a cooling water circuit in which a battery 2 during discharging or charging is cooled with cooling water, the control device 1 of the present embodiment cools the cooling water with a secondary refrigerant. The control device 1 can reduce the power required for cooling the battery 2 by changing a timing to begin cooling the cooling water with the secondary refrigerant depending on a charge amount (i.e., state of charge) of the battery 2.

The vehicle 100 includes the control device 1, the battery 2, a radiator 3, a radiator fan 4, a switching part 5, a pump 6, a chiller 7, a water temperature sensor 8, a water temperature sensor 9, an electric compressor 11, a condenser 12, a condenser fan 13, a refrigerant expansion valve 14, an evaporator 15, a blower fan 16, and a refrigerant expansion valve 17.

The battery 2 is a lithium-ion battery for an electric vehicle, for example. The battery 2 generates heat during discharging and charging. The battery 2 is cooled by exchanging heat with the cooling water circulating through the cooling water circuit. The upper side of FIG. 1 shows the cooling water circuit. The cooling water circuit exchanges heat between the battery 2 and the cooling water, and circulates the cooling water in the cooling water circuit.

The radiator 3 exchanges heat between the cooling water and the outside air in the cooling water circuit. The radiator fan 4 rotates to generate the flow of the outside air passing through the radiator 3, thereby cooling the cooling water passing through the radiator 3.

The switching part 5 switches a flow path of the cooling water. In the example shown in FIG. 1, the switching part 5 is a valve for switching whether or not to cause the cooling water to flow through the radiator 3. The pump 6 generates the flow of the cooling water in the cooling water circuit. The chiller 7 cools the cooling water by exchanging heat between the cooling water and the secondary refrigerant. The chiller 7 exchanges heat between (i) a mist that is low-temperature and low-pressure secondary refrigerant that passed through the refrigerant expansion valve 17 and (ii) high-temperature cooling water, thereby vaporizing the secondary refrigerant. The secondary refrigerant cools the cooling water by removing heat from the surrounding cooling water during vaporization.

The water temperature sensor 8 (corresponding to a first water temperature sensor) is disposed upstream of the radiator 3 in the cooling water circuit. The water temperature sensor 8 measures a first water temperature of the cooling water flowing into the radiator 3. The water temperature sensor 9 (corresponding to a second water temperature sensor) is disposed downstream of the radiator 3 in the cooling water circuit. The water temperature sensor 9 measures a second water temperature of the cooling water after heat exchange with the outside air in the radiator 3.

The lower side of FIG. 1 shows a refrigeration cycle in which evaporation and condensation of the secondary refrigerant are repeated. The refrigeration cycle circulates the secondary refrigerant for cooling the cooling water. The electric compressor 11 compresses the low-temperature and low-pressure secondary refrigerant that is vaporized by heat exchange with the cooling water in the chiller 7 to bring this secondary refrigerant into a high-temperature and high-pressure state. The condenser 12 cools and condenses the high-temperature and high-pressure secondary refrigerant by cooling air generated by the condenser fan 13.

The refrigerant expansion valve 14, the evaporator 15, and the blower fan 16 are provided in the interior of the vehicle 100. The refrigerant expansion valve 14 forcibly sprays the liquid secondary refrigerant condensed by the condenser 12 from a small hole, thereby expanding the secondary refrigerant and bringing the secondary refrigerant into a state of mist with low temperature and low pressure.

The refrigerant expansion valve 14 supplies the mist, which is the low-temperature and low-pressure secondary refrigerant, to the evaporator 15. The refrigerant expansion valve 14 switches between an open state in which the secondary refrigerant is supplied to the evaporator 15 and a closed state in which the secondary refrigerant is not supplied to the evaporator 15 on the basis of a control signal from the control device 1.

The evaporator 15 exchanges heat between the mist that is low-temperature and low-pressure secondary refrigerant that passed through the refrigerant expansion valve 14 and the air in the vehicle interior, thereby vaporizing the secondary refrigerant. The secondary refrigerant removes heat from the air in the vehicle interior in vaporization, thereby decreasing the temperature in the vehicle interior. The blower fan 16 generates the flow of air so that the air in the vehicle interior passes through the evaporator 15, and exchanges heat between the secondary refrigerant and the air in the vehicle interior.

Similar to the refrigerant expansion valve 14 described above, the refrigerant expansion valve 17 forcibly sprays the liquid secondary refrigerant from a small hole, thereby expanding the secondary refrigerant and bringing the secondary refrigerant into a state of mist and low temperature and low pressure. The refrigerant expansion valve 17 supplies the mist that is low-temperature and low-pressure secondary refrigerant to the chiller 7. The refrigerant expansion valve 17 switches between an open state in which the secondary refrigerant is supplied to the chiller 7 and a closed state in which the secondary refrigerant is not supplied to the chiller 7 on the basis of a control signal from the control device 1.

The control device 1 is an Electronic Control Unit (ECU), for example. The control device 1 controls cooling of the cooling water by the radiator 3. The control device 1 controls the electric compressor 11 included in the refrigeration cycle for circulating the secondary refrigerant. The control device 1 measures a terminal voltage of the battery 2, and identifies a charge amount of the battery 2 on the basis of the measured terminal voltage. The control device 1 acquires a temperature in the battery cell of the battery 2 measured by a battery cell temperature sensor provided in the battery cell of the battery 2.

The control device 1 determines a cooling-onset battery cell temperature for beginning cooling of the cooling water with the secondary refrigerant on the basis of the identified charge amount of the battery 2. At this time, the higher the identified charge amount of the battery 2 is, the lower the control device 1 determines the cooling-onset battery cell temperature to be. On condition that the temperature in the battery cell is higher than the determined cooling-onset battery cell temperature, the control device 1 operates the electric compressor 11 to being cooling the cooling water with the secondary refrigerant.

The temperature in the battery cell of the battery 2 rises even though the control device 1 is cooling the cooling water with the secondary refrigerant. However, when the charge amount of the battery 2 is low, the battery is likely to die before the temperature in the battery cell of the battery 2 becomes high. Therefore, in a state where the charge amount of the battery 2 is low, the control device 1 determines a high temperature serving as a cooling-onset battery cell temperature for beginning cooling of the battery 2. In this way, the control device 1 delays a timing at which to being cooling the cooling water with the secondary refrigerant, thereby reducing the power required for cooling the battery 2.

In contrast, when the charge amount of the battery 2 is high, there is a possibility that the temperature in the battery cell of the battery 2 becomes high due to the battery 2 operating for a long time. Therefore, the control device 1 determines a low temperature serving as a cooling-onset battery cell temperature for beginning cooling of the battery 2. In this way, the control device 1 begins cooling the battery 2 with the secondary refrigerant early, thereby preventing the temperature in the battery cell of the battery 2 from becoming high.

[Configuration of the Vehicle]

Figure 2:
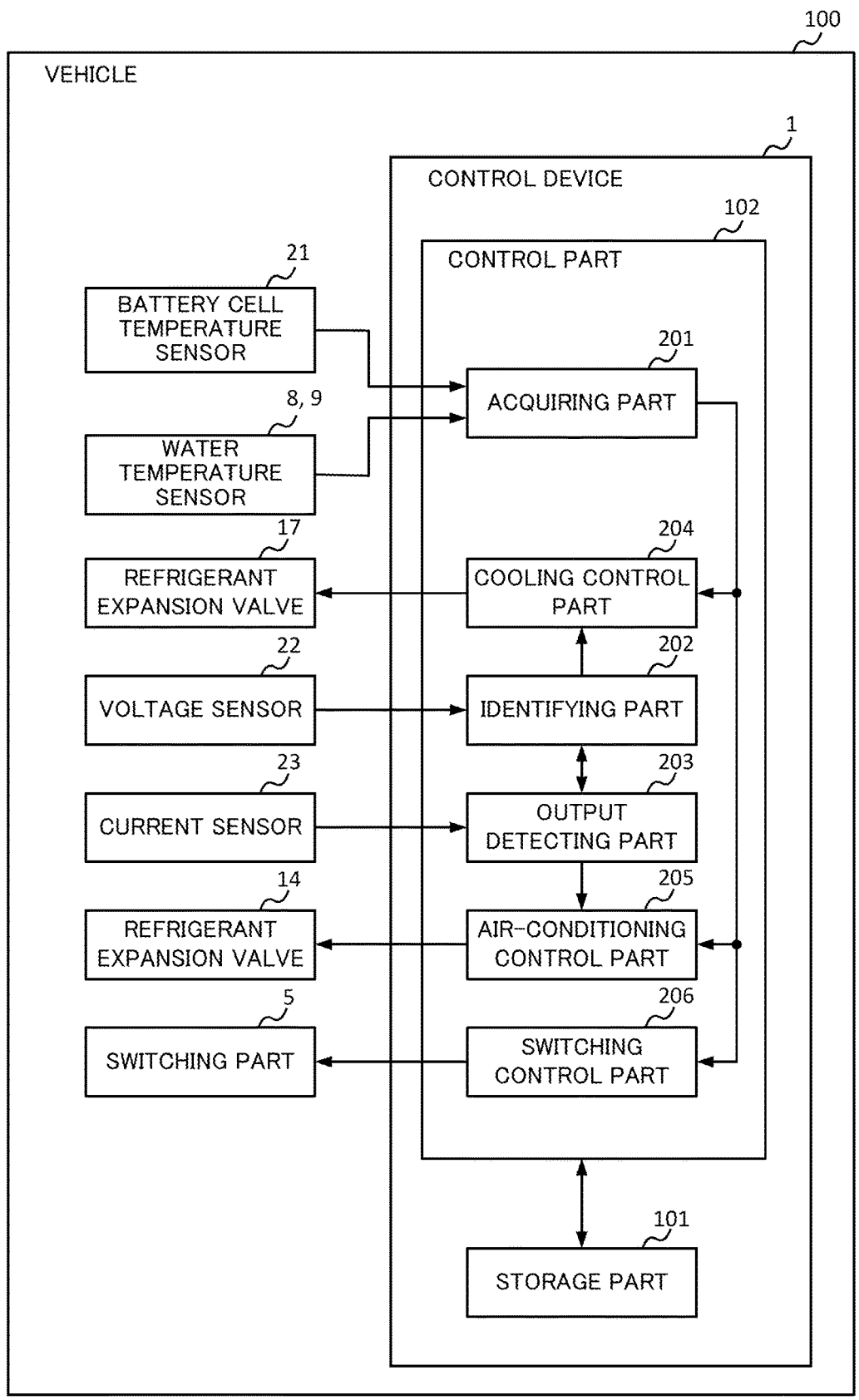
FIG. 2 shows a main configuration of the vehicle.

FIG. 2 shows a main configuration of the vehicle 100. The vehicle 100 includes the control device 1, the switching part 5, the water temperature sensor 8, the water temperature sensor 9, the refrigerant expansion valve 14, the refrigerant expansion valve 17, the battery cell temperature sensor 21, a voltage sensor 22, and a current sensor 23. The control device 1 includes a storage part 101 and a control part 102.

The battery cell temperature sensor 21 measures a temperature in the battery cell of the battery 2. A plurality of battery cell temperature sensors 21 are disposed at each of a plurality of battery cells of the battery 2. It is assumed that a plurality of battery cell temperature sensors 21 are arranged per one battery cell. The battery cell temperature sensor 21 is preferably disposed at a position that is to have the highest temperature in the battery cell. The battery cell temperature sensor 21 inputs the measurement result of the temperature in the battery cell to the acquiring part 201.

The voltage sensor 22 measures a terminal voltage of the battery 2. The voltage sensor 22 inputs the measurement result of the terminal voltage of the battery 2 to an identifying part 202 and an output detecting part 203. A current sensor 23 measures a current flowing through the battery 2. The current sensor 23 inputs the measurement result of the current to the identifying part 202 and the output detecting part 203.

The storage part 101 includes a Read Only Memory (ROM) and a Random Access Memory (RAM), for example. The storage part 101 stores various programs and various types of data for causing the control part 102 to function. By executing a program stored in the storage part 101, the control part 102 functions as the acquiring part 201, the identifying part 202, the output detecting part 203, the cooling control part 204, an air-conditioning control part 205, and a switching control part 206.

The acquiring part 201 acquires a temperature in the battery cell of the battery 2. For example, the acquiring part 201 acquires a temperature in the battery cell of the battery 2 measured by the battery cell temperature sensor 21 for each battery cell. The acquiring part 201 acquires a first water temperature of the cooling water measured by the water temperature sensor 8 (corresponding to the first water temperature sensor) disposed upstream of the radiator 3. The acquiring part 201 acquires a second water temperature of the cooling water measured by the water temperature sensor 9 (corresponding to the second water temperature sensor) disposed downstream of the radiator 3. The acquiring part 201 outputs information indicating the acquired temperature in the battery cell to the cooling control part 204 and the air-conditioning control part 205. The acquiring part 201 outputs information indicating the acquired first water temperature and second water temperature, to the switching control part 206.

The identifying part 202 identifies a charge amount of the battery 2. For example, on the basis of the terminal voltage of the battery 2 measured by the voltage sensor 22, the identifying part 202 identifies an amount of decrease in the terminal voltage of the battery 2 from the fully charged state. The identifying part 202 identifies the charge amount of the battery 2 on the basis of the identified amount of decrease in the terminal voltage of the battery 2.

The identifying part 202 identifies the degree of deterioration such as decrease in capacity or increase in internal resistance of the battery 2. The identifying part 202 measures a voltage and a current of the battery 2 with the voltage sensor 22 and the current sensor 23, respectively, and analyzes a voltage waveform and a current waveform of the battery 2, thereby identifying the degree of deterioration of the battery 2. The identifying part 202 outputs information indicating the identified degree of deterioration to the cooling control part 204.

The output detecting part 203 detects the output of the battery 2. For example. the output of the battery 2 is the power supplied from the battery 2. For example, the output detecting part 203 detects the output of the battery 2 on the basis of the terminal voltage of the battery 2 measured by the voltage sensor 22 and the current flowing through the battery 2 measured by the current sensor 23. The output detecting part 203 notifies the air-conditioning control part 205 about the detected output of the battery 2.

[Determination of Cooling-Onset Battery Cell Temperature]

Figure 3:
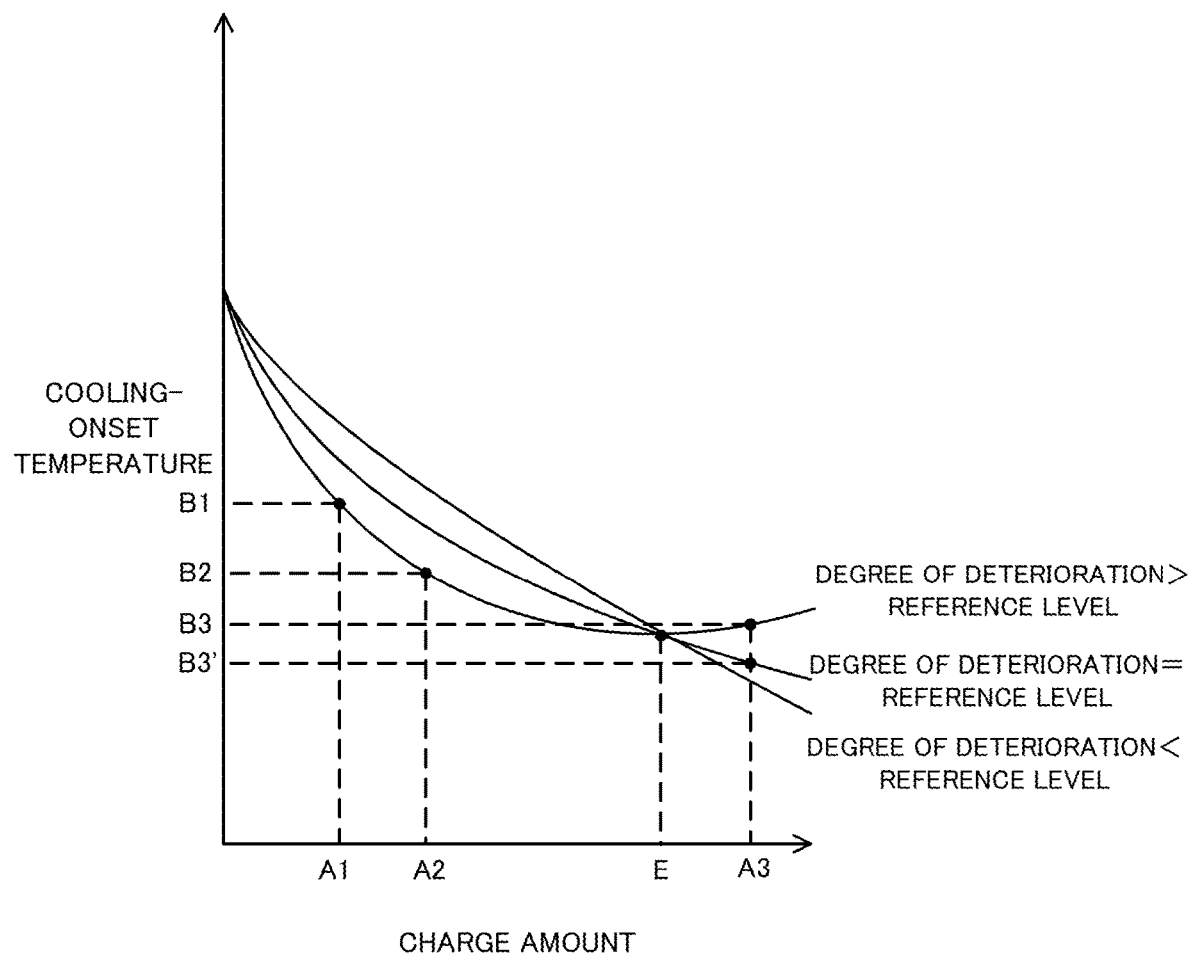
FIG. 3 is a graph showing a relationship between a cooling-onset battery cell temperature, a charge amount of a battery, and the degree of deterioration of the battery.

The cooling control part 204 controls cooling of the cooling water with the secondary refrigerant. First, the cooling control part 204 determines a cooling-onset battery cell temperature for beginning cooling of the cooling water with the secondary refrigerant. In the example of this specification, the cooling control part 204 determines the cooling-onset battery cell temperature on the basis of the charge amount identified by the identifying part 202. FIG. 3 shows a relationship between a cooling-onset battery cell temperature determined by the cooling control part 204, a charge amount of the battery 2, and the degree of deterioration of the battery 2. The vertical axis of FIG. 3 represents a cooling-onset battery cell temperature. The horizontal axis of FIG. 3 represents a charge amount of the battery 2. The three lines shown in FIG. 3 indicate a cooling-onset battery cell temperature when the degree of deterioration of the battery 2 identified by the identifying part 202 is higher than a predetermined reference level, a cooling-onset battery cell temperature when the identified degree of deterioration of the battery 2 is equal to the reference level, and a cooling-onset battery cell temperature when the degree of deterioration of the battery 2 identified by the identifying part 202 is lower than the reference level.

As shown in FIG. 3, the lower that the charge amount identified by the identifying part 202 is, the higher the cooling control part 204 determines a cooling-onset battery cell temperature to be. In the example of the line indicating a case where the degree of deterioration of the battery 2 is higher than the predetermined reference level, which is shown in FIG. 3, it is assumed that the identifying part 202 identifies a first charge amount A1, and the identifying part 202 identifies a second charge amount A2, which is higher than the first charge amount A1. At this time, when the identifying part 202 identifies the first charge amount A1, the cooling control part 204 determines a cooling-onset battery cell temperature B1 that is higher than a cooling-onset battery cell temperature B2 in a case where the identifying part 202 identifies the second charge amount A2.

When the degree of deterioration of the battery 2 is relatively high, chargeable capacity of the battery 2 is small. Therefore, when the degree of deterioration of the battery 2 is relatively high, the cooling control part 204 determines a higher cooling-onset battery cell temperature in the same manner as in a case where the charge amount of the battery 2 is relatively low. In the example of FIG. 3, when the identifying part 202 identifies the degree of deterioration (corresponding to a first degree of deterioration) that is equal to the reference level in a state where the charge amount identified by the identifying part 202 is equal to or greater than a predetermined value E, the cooling control part 204 determines a cooling-onset battery cell temperature B3' that is lower than a cooling-onset battery cell temperature B3 in a case where the identifying part 202 identifies the degree of deterioration (corresponding to a second degree of deterioration) that is higher than the reference level in a state where the charge amount is equal to or greater than the same predetermined value E. The predetermined value E indicates a value of a charge amount corresponding to an intersection of the lines corresponding to a plurality of degree of deterioration of FIG. 3, for example.

[Beginning of Cooling with the Secondary Refrigerant]

The cooling control part 204 operates the electric compressor 11 to begin cooling the cooling water with the secondary refrigerant on condition that the temperature in the battery cell of the battery 2 acquired by the acquiring part 201 is higher than the determined cooling-onset battery cell temperature. In the example of this specification, the cooling control part 204 begins cooling the cooling water with the secondary refrigerant on condition that the highest temperature among temperatures in the battery cell acquired by the acquiring part 201 is higher than the cooling-onset battery cell temperature.

Figure 4:
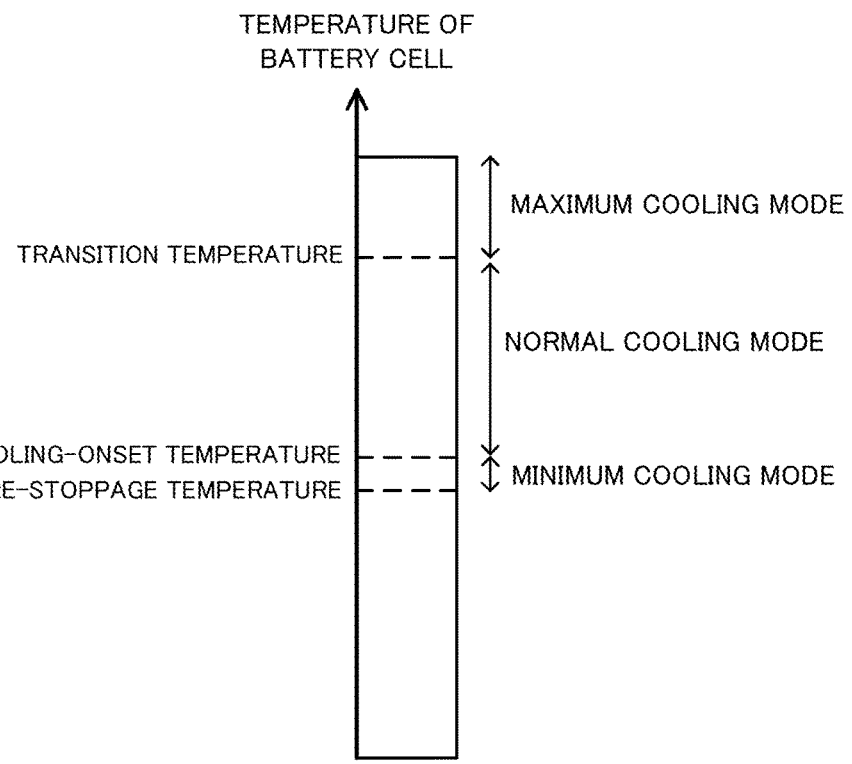
FIG. 4 shows a relationship between a temperature in a battery cell of the battery and operation of a cooling control part.

FIG. 4 shows a relationship between a temperature in the battery cell of the battery 2 and operation of the cooling control part 204. It is assumed that the temperature in the battery cell shown in FIG. 4 is the highest temperature among temperatures in the battery cell of the battery 2 measured by the plurality of battery cell temperature sensors 21.

When the temperature in the battery cell acquired by the acquiring part 201 is equal to or lower than a pre-stoppage temperature, the cooling control part 204 does not begin cooling the cooling water with the secondary refrigerant. When the temperature in the battery cell is higher than the pre-stoppage temperature, and when the temperature in the battery cell is equal to or lower than the cooling-onset battery cell temperature, the cooling control part 204 operates in a minimum cooling mode. In the minimum cooling mode, the cooling control part 204 does not perform cooling of the cooling water with the secondary refrigerant. In this minimum cooling mode, the cooling water is cooled by passing through the radiator 3.

When the temperature in the battery cell is higher than the cooling-onset battery cell temperature, and when the temperature in the battery cell is lower than a transition temperature, the cooling control part 204 operates in a normal cooling mode. When the temperature in the battery cell is equal to or higher than the transition temperature, the cooling control part 204 operates in a maximum cooling mode. In both the normal cooling mode and the maximum cooling mode, the cooling control part 204 cools the cooling water with the secondary refrigerant. In the normal cooling mode, while the cooling control part 204 cools the cooling water with the secondary refrigerant, the air-conditioning control part 205 to be described later exchanges heat between the air in the vehicle interior and the secondary refrigerant. On the other hand, in the maximum cooling mode, the cooling control part 204 preferentially cools the cooling water with the secondary refrigerant, and the air-conditioning control part 205 limits heat exchange between the air in the vehicle interior and the secondary refrigerant. In the normal cooling mode and the maximum cooling mode, the cooling water is cooled by passing through the radiator 3 in the same manner as in the minimum cooling mode.

Although the example of FIG. 4 does not indicate a temperature of the cooling water, the cooling control part 204 operates in the normal cooling mode when the temperature in the battery cell is higher than the cooling-onset battery cell temperature, when the temperature in the battery cell is lower than the transition temperature, and when the first water temperature measured by the water temperature sensor 8 is higher than a reference water temperature. The reference temperature is determined as a temperature suitable for cooling the battery 2 by a person skilled in the art, for example.

On the other hand, when the temperature in the battery cell is higher than the pre-stoppage temperature but equal to or lower than the cooling battery cell temperature, the cooling control part 204 operates in the minimum cooling mode. When the temperature in the battery cell is higher than the cooling-onset battery cell temperature, but the first water temperature measured by the water temperature sensor 8 is equal to or lower than the reference water temperature, the cooling control part 204 operates in the minimum cooling mode.

Figure 5:
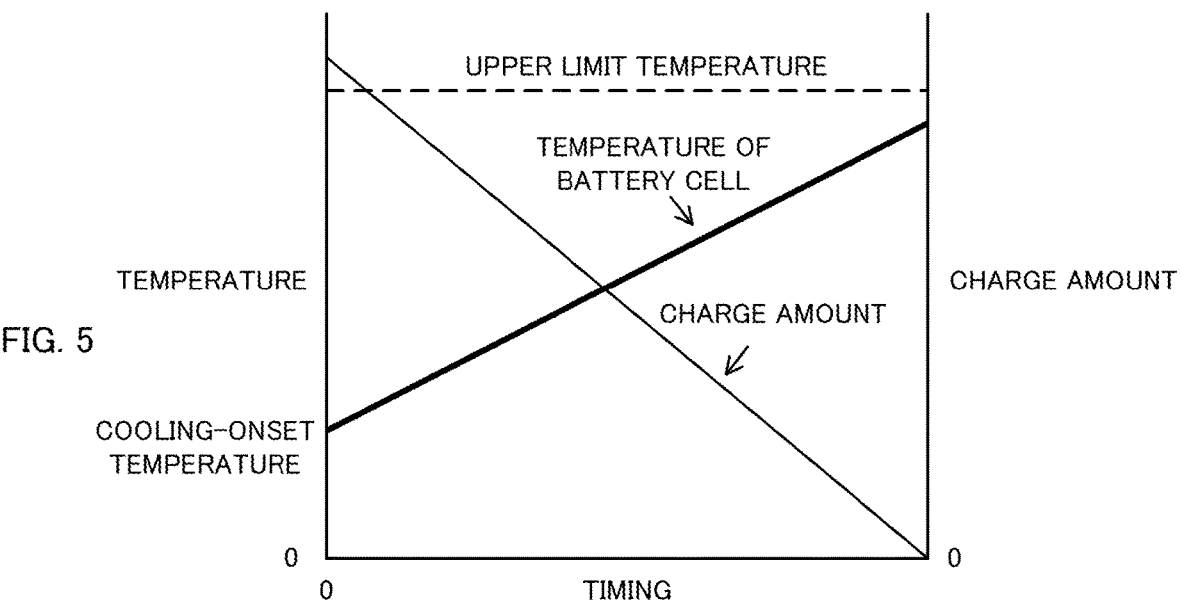
FIG. 5 shows an example of cooling of cooling water with the cooling control part using a secondary refrigerant.

The cooling control part 204 cools the cooling water with the secondary refrigerant so that the temperature in the battery cell does not exceed a predetermined upper limit temperature during a time period before the battery 2 dies. FIG. 5 shows an example of cooling the cooling water with the cooling control part 204 using the secondary refrigerant. The vertical axes of FIG. 5 represent a temperature in the battery cell and a charge amount of the battery 2. The horizontal axis of FIG. 5 represents a timing.

In the example of FIG. 5, a timing at which a temperature in the battery cell exceeds the cooling-onset battery cell temperature is indicated as 0 seconds. At this time, the cooling control part 204 begins cooling the cooling water with the secondary refrigerant. At this time, since the amount of heat generated by the battery 2 due to discharging is larger than the amount of cooling by the cooling control part 204, the temperature in the battery cell (the thick line in FIG. 5) rises over time. On the other hand, as shown in FIG. 5, the charge amount of the battery 2 decreases over time due to discharging.

On the basis of the charge amount identified by the identifying part 202, the cooling control part 204 identifies a timing at which the battery 2 will die. The cooling control part 204 adjusts the amount of cooling of the cooling water with the secondary refrigerant so that the temperature in the battery cell does not exceed the upper limit temperature before the battery 2 dies.

For example, by alternately switching between the open state in which the refrigerant expansion valve 17 shown in FIG. 1 is open and the closed state in which the refrigerant expansion valve 17 is closed, the cooling control part 204 adjusts the amount of the secondary refrigerant supplied to the chiller 7, and adjusts the amount of cooling of the cooling water with the secondary refrigerant. The cooling control part 204 determines a rate of a time period during which to bring the refrigerant expansion valve 17 into the open state relative to the entire time period so that the temperature in the battery cell becomes lower than the upper limit temperature at the moment when the charge amount of the battery 2 shown in FIG. 5 becomes zero. The cooling control part 204 controls the refrigerant expansion valve 17 so as to bring the refrigerant expansion valve 17 into the open state for the determined time. The cooling control part 204 may adjust the amount of cooling of the cooling water with the secondary refrigerant by adjusting the output power of the electric compressor 11.

[Cooling the Battery 2 Before the Vehicle Stops]

If the temperature in the battery cell in the battery 2 remains equal to or higher than the pre-stoppage temperature (FIG. 4) for a long time, the battery 2 is at risk of deteriorating. For this reason, the cooling control part 204 cools the battery 2 to the pre-stoppage temperature or lower, before or after the vehicle 100 ends traveling. At this time, even though the temperature in the battery cell is equal to or lower than the cooling-onset battery cell temperature, it is assumed that the cooling control part 204 cools the cooling water with the secondary refrigerant.

First, the cooling control part 204 identifies an expected arrival time when the vehicle 100 equipped with the control device 1 will arrive at a destination. For example, if an operation receiving part (not shown) receives an operation made by the driver to designate the destination, the cooling control part 204 identifies a travel time period required for the vehicle 100 to travel from a current location of the vehicle 100 to the destination. The cooling control part 204 identifies the expected arrival time on the basis of the current time and the identified travel time period.

The cooling control part 204 cools the cooling water with the secondary refrigerant so as to reduce the temperature in the battery cell of the battery 2 to a predetermined pre-stoppage temperature or lower by the identified expected arrival time. For example, the cooling control part 204 adjusts the amount of cooling of the cooling water with the secondary refrigerant so as to reduce the temperature in the battery cell of the battery to the predetermined pre-stoppage temperature or lower by the identified expected arrival time. In this manner, the cooling control part 204 can prevent the battery 2 from deteriorating. The cooling control part 204 is not limited to the example of reducing the temperature of the battery 2 to the pre-stoppage temperature or lower by the expected arrival time, and may cool the battery 2 to the pre-stoppage temperature by continuing to cool the battery 2 with the secondary refrigerant for a certain time period after the vehicle 100 has parked in a parking lot at the destination.

[Intermittent Operation of Air-Conditioning in the Vehicle Interior]

The air-conditioning control part 205 cools the air in the vehicle interior with the secondary refrigerant. The air-conditioning control part 205 reduces the temperature in the interior of the vehicle 100 by exchanging heat between the secondary refrigerant and the air in the interior in the evaporator 15 included in the refrigeration cycle.

When the temperature in the battery cell of the battery 2 is higher than the transition temperature, the air-conditioning control part 205 prioritizes cooling of the cooling water with the secondary refrigerant over reducing the temperature in the vehicle interior with the secondary refrigerant. More specifically, when the cooling control part 204 is cooling the cooling water with the secondary refrigerant, on condition that the temperature acquired by the acquiring part 201 is higher than the transition temperature, the air-conditioning control part 205 stops heat exchange between the secondary refrigerant and the air in the interior for a stoppage time period every predetermined time period. The stoppage time period is shorter than the predetermined time period. The transition temperature is an upper limit value of the temperature in the battery cell that allows cooling the battery 2 with the cooling water and the secondary refrigerant without limiting the supply of the secondary refrigerant to the evaporator 15, for example.

Figure 6:
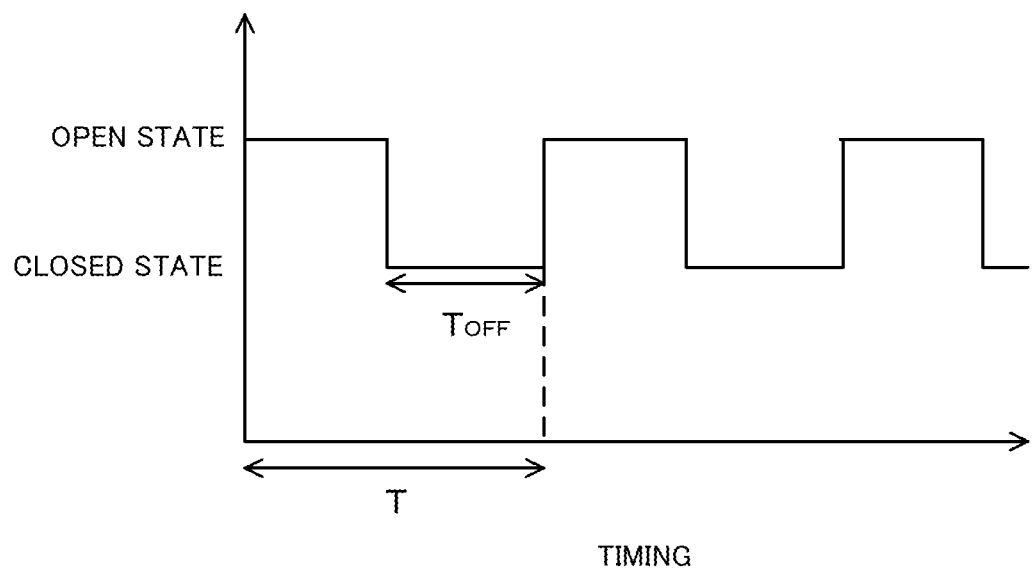
FIG. 6 shows an example of controlling a refrigerant expansion valve with an air-conditioning control part.

In the example of this specification, the air-conditioning control part 205 controls the refrigerant expansion valve 14 to close, thereby stopping the supply of the secondary refrigerant to the evaporator 15 in the vehicle interior and stopping heat exchange between the secondary refrigerant and the air in the interior. FIG. 6 shows an example of controlling the refrigerant expansion valve 14 with the air-conditioning control part 205. The vertical axis represents an open state in which the refrigerant expansion valve is open and a closed state in which the refrigerant expansion valve is closed. In the example of FIG. 6, the air-conditioning control part 205 limits the supply of the secondary refrigerant to the evaporator 15 by closing the refrigerant expansion valve 14 for a stoppage time period $T_{OFF}$ every predetermined time period T.

In a case where the output of the battery 2 is small even though the temperature in the battery cell of the battery 2 is higher than the transition temperature, it is possible to cool the battery 2 with the secondary refrigerant without limiting the supply of the secondary refrigerant to the evaporator 15. Due to this, when the output of the battery 2 detected by the output detecting part 203 is equal to or lower than a reference value, the air-conditioning control part 205 does not stop heat exchange between the secondary refrigerant and the air in the interior. The reference value is a maximum value of the output of the battery 2 that allows cooling of the battery 2 with the cooling water and the secondary refrigerant in a state where the supply of the secondary refrigerant to the evaporator 15 is not limited.

[Switching the Cooling Water Circuit]

The switching control part 206 controls the switching part 5 for switching a flow path of the cooling water. When a value obtained by subtracting the second water temperature from the first water temperature acquired by the acquiring part 201 is equal to or greater than a first reference value, the switching control part 206 controls the switching part 5 so that the cooling water circulates the first cooling water circuit through the radiator 3. When the value obtained by subtracting the second water temperature from the first water temperature acquired by the acquiring part 201 is less than a second reference value that is smaller than the first reference value, the switching control part 206 controls the switching part 5 so that the cooling water circulates through the second cooling water circuit that does not pass through the radiator 3.

Figure 7:
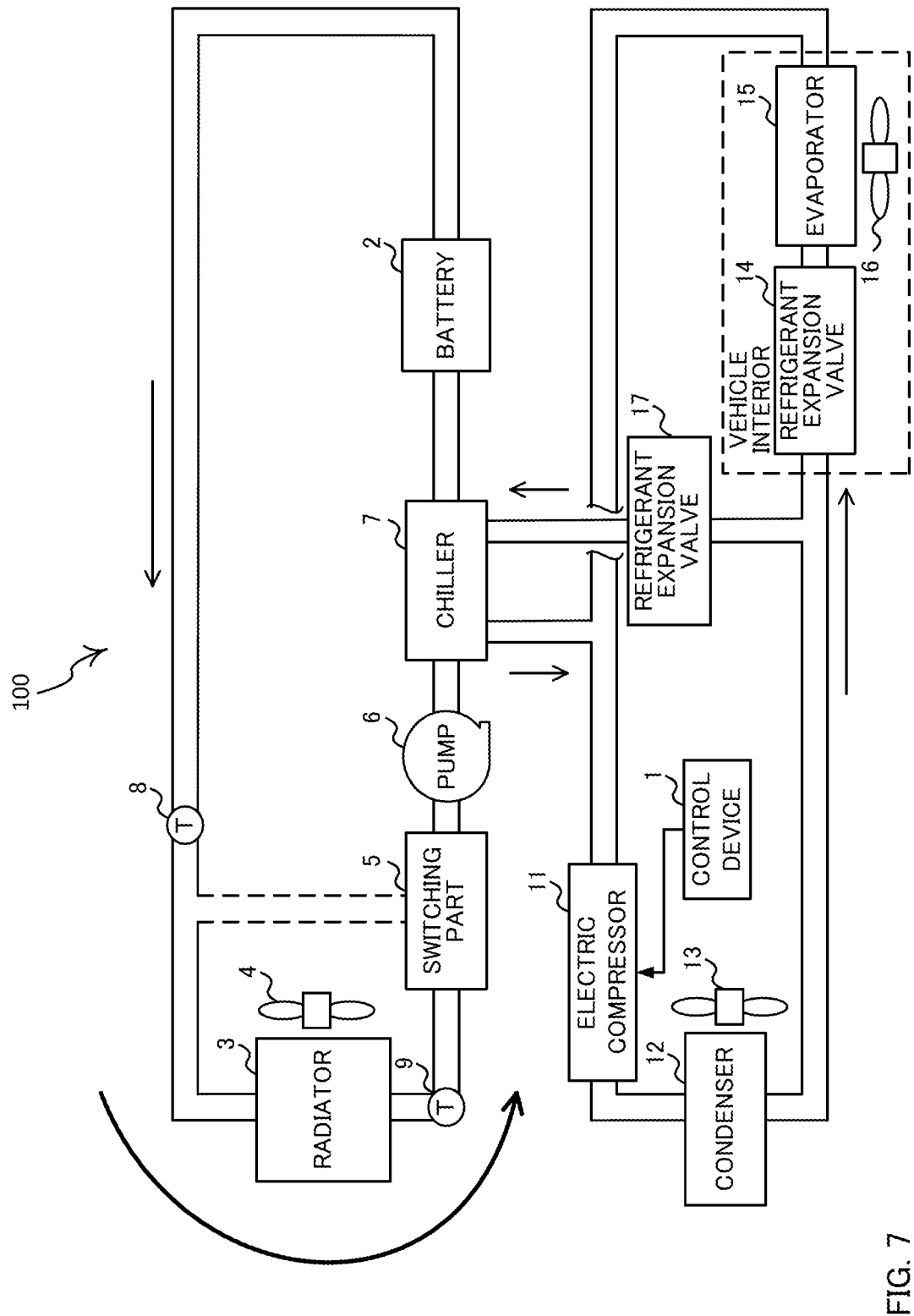
FIG. 7 shows an example of controlling a switching part with a switching control part.
Figure 8:
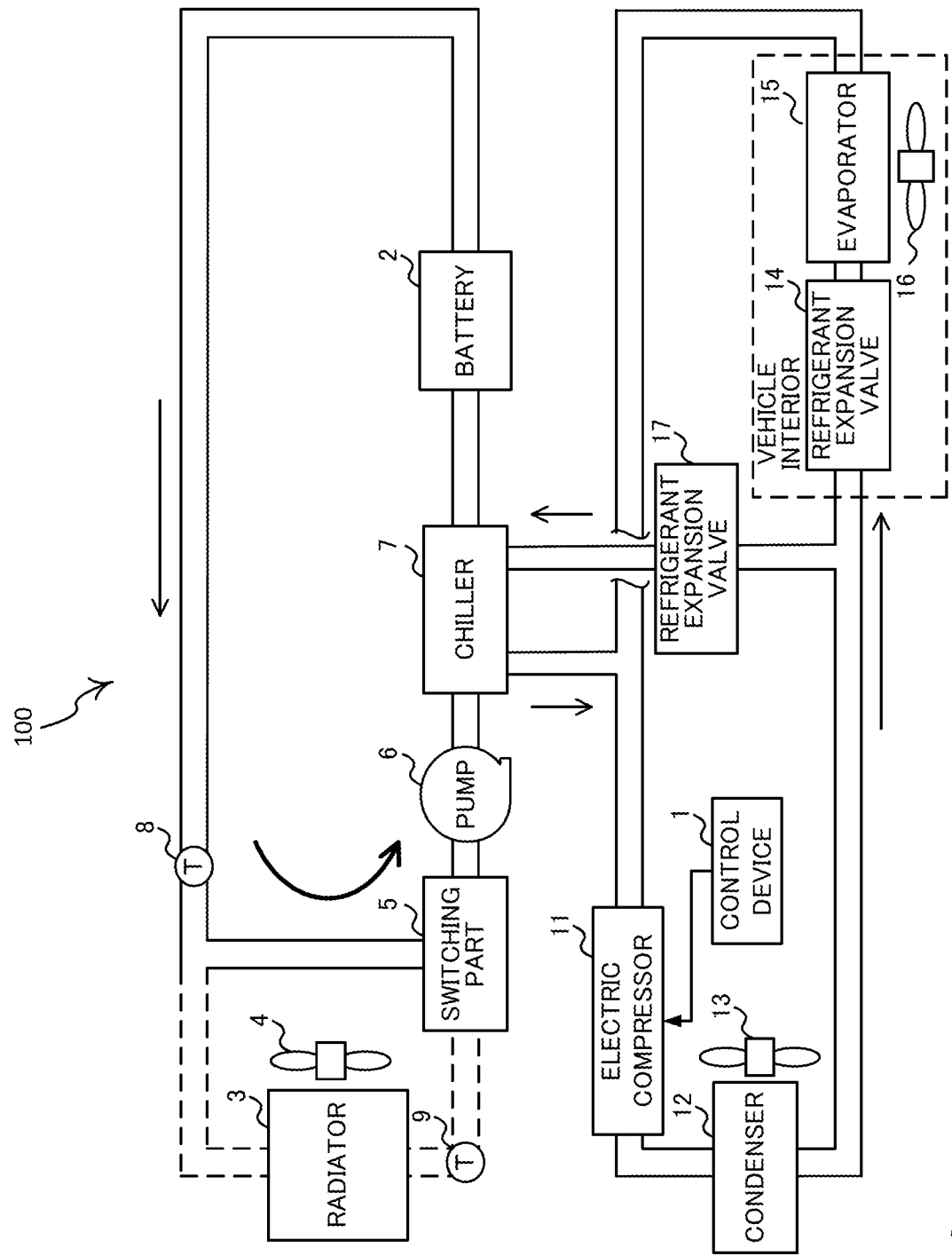
FIG. 8 shows an example of controlling the switching part with the switching control part.

FIGS. 7 and 8 show examples of controlling the switching part 5 with the switching control part 206. FIG. 7 shows a state where the cooling water circulates through the first cooling water circuit that passes through the radiator 3. FIG. 8 shows a state where the cooling water circulates through the second cooling water circuit that does not pass through the radiator 3.

As shown in FIG. 7, in the first cooling water circuit, the cooling water that passed through the battery 2 passes through the water temperature sensor 8, the radiator 3, the water temperature sensor 9, the switching part 5, the pump 6, and the chiller 7, and returns to the battery 2. At this time, the cooling water does not pass through a bypass indicated by the broken line in FIG. 7.

As shown in FIG. 8, in the second cooling water circuit, the cooling water that passed through the battery 2 passes through the water temperature sensor 8, the switching part 5, the pump 6, and the chiller 7, and returns to the battery 2. At this time, the cooling water does not pass through the radiator 3 and the water temperature sensor 9.

The switching control part 206 calculates a value obtained by subtracting the second water temperature measured by the water temperature sensor 9 from the first water temperature measured by the water temperature sensor 8. This value indicates an amount of decrease in the temperature of the cooling water, which is caused by heat exchange between the outside air and the cooling water in the radiator 3. When this value is equal to or greater than the first reference value, the switching control part 206 determines that the cooling water is cooled by the radiator 3. The first reference value is a value that is larger than 0, for example. At this time, the switching control part 206 controls the switching part 5 so as to circulate the cooling water in the first cooling water circuit shown in FIG. 7.

When the value obtained by subtracting the second water temperature from the first water temperature acquired by the acquiring part 201 is less than the second reference value, the switching control part 206 determines that the cooling water is not cooled by the radiator 3. At this time, the switching control part 206 controls the switching part 5 so that the cooling water circulates through the second cooling water circuit that does not pass through the radiator 3. The second reference value is a value that is smaller than 0, for example. In this way, when the outside air is at a relatively-high temperature, the switching control part 206 can prevent the temperature of the cooling water from rising due to heat exchange with the outside air in the radiator 3.

[Processing Procedure of Cooling the Cooling Water with the Secondary Refrigerant]

Figure 9:
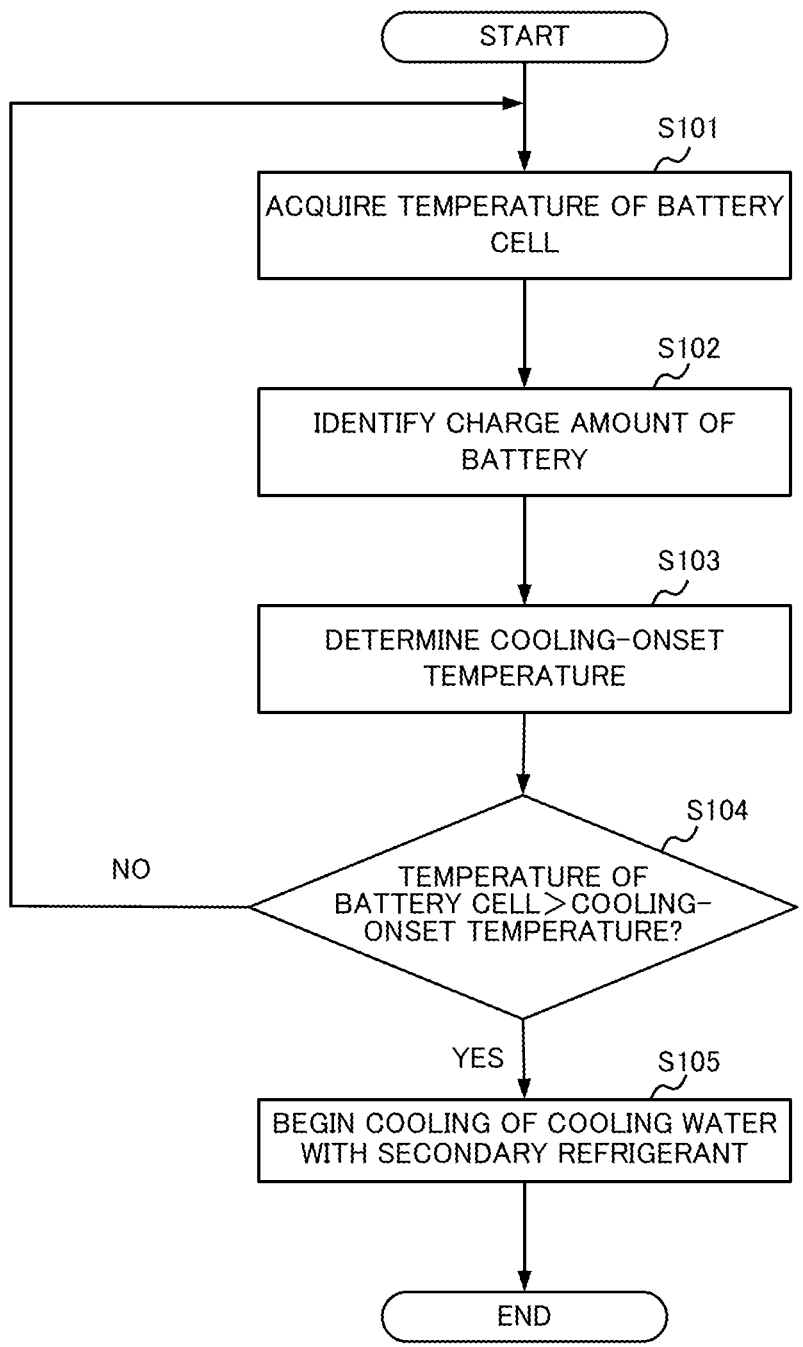
FIG. 9 is a flowchart showing a processing procedure for cooling the cooling water with the control device using the secondary refrigerant.

FIG. 9 is a flowchart showing a processing procedure of cooling the cooling water with the control device 1 using the secondary refrigerant. This processing procedure starts while the vehicle 100 is traveling. First, the acquiring part 201 acquires a temperature in the battery cell of the battery 2 (S101). The identifying part 202 identifies a charge amount of the battery 2 (S102). The cooling control part 204 determines a cooling-onset battery cell temperature on the basis of the charge amount identified by the identifying part 202 (S103).

The cooling control part 204 determines whether or not the temperature in the battery cell acquired by the acquiring part 201 is higher than the cooling-onset battery cell temperature (S104). On condition that the temperature in the battery cell acquired by the acquiring part 201 is higher than the cooling-onset battery cell temperature ("YES" in S104), the cooling control part 204 operates the electric compressor 11 to begin cooling the cooling water with the secondary refrigerant (S105), and ends the processing. When the temperature in the battery cell acquired by the acquiring part 201 in the determination of S104 is equal to or lower than the cooling-onset battery cell temperature ("NO" in S104), the cooling control part 204 returns to the processing of S101 without beginning cooling of the cooling water with the secondary refrigerant.

[Effects of the Control Device 1 of the Present Embodiment]

When a charge amount of the battery 2 is low, the cooling control part 204 determines a high temperature serving as a cooling-onset battery cell temperature for beginning cooling of the battery 2. In this way, the cooling control part 204 delays a timing at which to begin cooling the cooling water with the secondary refrigerant, thereby reducing the power required for cooling the battery 2.

On the other hand, when the charge amount of the battery 2 is high, the temperature in the battery cell of the battery 2 may become high due to the battery 2 operating for a long time. Therefore, the cooling control part 204 determines a low temperature serving as a cooling-onset battery cell temperature for beginning cooling of the battery 2. In this way, the cooling control part 204 can prevent the temperature in the battery cell of the battery 2 from becoming high by beginning cooling of the battery 2 with the secondary refrigerant early.

In the present embodiment, the cooling control part 204 directly controls an adjustment of the output power of the electric compressor 11, and the cooling control part 204 directly controls switching between the open state and the closed state of the refrigerant expansion valve 17. The cooling control part 204 may control the adjustment of the output power of the electric compressor 11 via another air-conditioning control device (not shown). The cooling control part 204 instructs this other air-conditioning control device to adjust the output power of the electric compressor 11, and this air-conditioning control device may control the adjustment of the output power of the electric compressor 11. Similarly, the cooling control part 204 may control switching between the open state and the closed state of the refrigerant expansion valve 17 via another air-conditioning control device. The cooling control part 204 instructs this other air-conditioning control device to control switching between the open state and the closed state of the refrigerant expansion valve 17, and this air-conditioning control device may control switching between the open state and the closed state of the refrigerant expansion valve 17.

In the present embodiment, the air-conditioning control part 205 directly controls switching between the open state and the closed state of the refrigerant expansion valve 14. The air-conditioning control part 205 may control switching between the open state and the closed state of the refrigerant expansion valve 17 via another air-conditioning control device. The air-conditioning control part 205 instructs this other air-conditioning control device to control switching between the open state and the closed state of the refrigerant expansion valve 17, and this air-conditioning control device may control switching between the open state and the closed state of the refrigerant expansion valve 14.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF REFERENCE NUMERALS

1 control device
2 battery
3 radiator
4 radiator fan
5 switching part
6 pump
7 chiller
8 water temperature sensor
9 water temperature sensor
11 electric compressor
12 condenser
13 condenser fan
14 refrigerant expansion valve
15 evaporator
16 blower fan
17 refrigerant expansion valve
21 battery cell temperature sensor
22 voltage sensor
100 vehicle
101 storage part
102 control part
201 acquiring part
202 identifying part
203 output detecting part
204 cooling control part
205 air-conditioning control part
206 switching control part

The invention claimed is:

1. A control device controlling an electric compressor included in a refrigeration cycle for circulating a secondary refrigerant for cooling of cooling water that exchanges heat with a battery, the control device comprising:
   an acquiring part that acquires a temperature of a battery cell of the battery;
   an identifying part that identifies a charge amount of the battery; and
   a cooling control part that determines a cooling-onset battery cell temperature on a basis of the charge amount identified by the identifying part, and operates the electric compressor to begin cooling the cooling water with the secondary refrigerant, on condition that the temperature acquired by the acquiring part is higher than the determined, cooling-onset battery cell temperature, wherein
   when the identifying part identifies a first charge amount, the cooling control part determines the cooling-onset battery cell temperature that is higher than in a case where the identifying part identifies a second charge amount that is higher than the first charge amount.

2. The control device according to claim 1, wherein
   the cooling control part cools the cooling water with the secondary refrigerant so that the temperature of the battery cell does not exceed a predetermined upper limit temperature during a time period before the battery dies.

3. The control device according to claim 2, wherein
   the cooling control part cools the cooling water with a chiller for exchanging heat between the cooling water and the secondary refrigerant, and alternately switches between an open state in which a refrigerant expansion valve is open and a closed state in which the refrigerant expansion valve is closed, thereby controlling an amount of cooling for cooling the cooling water with the secondary refrigerant supplied to the chiller through the refrigerant expansion valve, and determines a rate of a time period during which to bring the refrigerant expansion valve into the open state relative to an entire time period so that the temperature of the battery cell becomes lower than the upper limit temperature during the time period before the battery dies.

4. The control device according to claim 1, further comprising an air-conditioning control part that reduces a temperature inside a vehicle by exchanging heat between the secondary refrigerant and air inside the vehicle in an evaporator included in the refrigeration cycle, and stops heat exchange between the secondary refrigerant and the air inside the vehicle, every predetermined time period, for a stoppage time period that is shorter than the predetermined time period, when the cooling control part is cooling the cooling water with the secondary refrigerant, on condition that the temperature acquired by the acquiring part is higher than a transition temperature.

5. The control device according to claim 4, further comprising an output detecting part that detects output of the battery, wherein
the air-conditioning control part does not stop the heat exchange between the secondary refrigerant and the air inside the vehicle when the output of the battery is equal to or less than a reference value.

6. The control device according to claim 1, wherein
the identifying part identifies a degree of deterioration of the battery, and
when the identifying part identifies a first degree of deterioration in a state where the charge amount identified by the identifying part is equal to or greater than a predetermined value, the cooling control part determines the cooling-onset battery cell temperature that is lower than in a case where the identifying part identifies a second degree of deterioration that is higher than the first degree of deterioration in a state where the charge amount is equal to or greater than the predetermined value.

7. The control device according to claim 1, wherein
the acquiring part acquires a first water temperature of the cooling water measured by a first water temperature sensor disposed upstream of a radiator that exchanges heat between the cooling water and outside air in a cooling water circuit for exchanging heat between the battery and the cooling water, and a second water temperature of the cooling water measured by a second water temperature sensor disposed downstream of the radiator, and
the control device further includes a switching control part that controls a switching part for switching a flow path of the cooling water so that the cooling water circulates through a first cooling water circuit that passes through the radiator when a value obtained by subtracting the second water temperature from the first water temperature is equal to or greater than a first reference value, and controls the switching part so that the cooling water circulates through a second cooling water circuit that does not pass through the radiator when the value obtained by subtracting the second water temperature from the first water temperature is less than a second reference value that is smaller than the first reference value.

8. The control device according to claim 1, wherein
the cooling control part identifies an expected arrival time when a vehicle equipped with the control device arrives at a destination, and cools the cooling water with the secondary refrigerant so as to reduce the temperature of the battery cell of the battery to a predetermined pre-stoppage temperature or lower by the expected arrival time.

9. The control device according to claim 1, wherein
the acquiring part acquires temperatures of a plurality of the battery cells of the battery, and
the cooling control part begins cooling the cooling water with the secondary refrigerant on condition that a highest temperature among the temperatures of the battery cells acquired by the acquiring part is higher than the cooling-onset battery cell temperature.

10. A control method for controlling an electric compressor included in a refrigeration cycle for circulating a secondary refrigerant for cooling of cooling water that exchanges heat with a battery, the control method comprising steps of:
acquiring a temperature of a battery cell of the battery;
identifying a charge amount of the battery;
determining a cooling-onset battery cell temperature on a basis of the identified charge amount; and
beginning cooling of the cooling water with the secondary refrigerant by operating the electric compressor on condition that the acquired temperature is higher than the determined, cooling-onset battery cell temperature, wherein
when a first charge amount is identified, the determining the cooling-onset battery cell temperature determines the cooling-onset battery cell temperature that is higher than in a case where a second charge amount that is higher than the first charge amount is identified.

* * * * *